Patented Feb. 22, 1949

2,462,591

UNITED STATES PATENT OFFICE 2,462,591

TREATMENT OF SYNTHETIC RUBBER LATEX

Erving Arundale, Westfield, N. J., assignor to Standard Oil Development Company, a corporation of Delaware No Drawing. Application June 1, 1946, Serial No. 673,899

9 Claims. (Cl. 260—84.5)

This invention pertains to the creaming of latices and particularly to the creaming of synthetic rubber latices prepared by the polymerization of diolefinic materials or by the copolymerization of diolefinic materials with certain unsaturated comonomers in aqueous emulsion.

Methods are known for concentrating natural rubber latex from 38–40% total solids to 60–70% total solids. Such methods include creaming, centrifuging, evaporation, electro-decantation and filtration. Only the first three of these methods are used to any extent commercially, and of these, the creaming process is undoubtedly the most important since a minimum amount of equipment is required and concentrates of high solids content can be produced. Creaming has a further advantage, particularly over the evaporation method due to the fact that water solubles for the most part tend to remain in the serum layer. Films deposited from the creams therefore generally have low ash and water absorption values.

These concentration processes work well with natural rubber latex because the particle size of the latex is quite large (1000 m$\mu$) and because the difference in density between the rubber and the media is about 0.09 gm./cc. However, synthetic rubber latices prepared by the emulsion polymerization technique cannot be concentrated readily to high solids content by the above mentioned methods because of the fact that the particle size thereof is much smaller (10–200 m$\mu$) and the density difference is much smaller, amounting only to between 0.01 and 0.04 gm./cc. Since creaming involves the addition of hydrophilic colloids such as gums, mosses, alkali alginates and the like to the dilute latex to slow down the Brownian movement and cause the rubber particles to rise to the surface due to the difference in density between the particles and the accompanying media, it is obvious they do not readily lend themselves to concentration by creaming. The same factors, i.e., particle size and density difference also control concentration by centrifuging, filtration, etc. While synthetic rubber latices can be concentrated to approximately 40–45% total solids content by an evaporation process through the removal of water by distillation under vacuum, this process is not satisfactory because it increases the amount of emulsifier and other water solubles in the concentrate. For example, when a latex prepared by the emulsion polymerization of butadiene and acrylonitrile using a soap emulsifier is concentrated from about 20% total solids to about 40–45% total solids by evaporation of water, the resultant concentrate is extremely viscous and the concentration of non-rubber-like material present therein is approximately doubled.

I have previously discovered and disclosed in my application Serial No. 556,659, filed September 30, 1944 now U. S. Patent No. 2,444,801, that the creaming method can be applied to synthetic rubber latices provided that the size of the synthetic rubber latex particles is increased by treating the dilute latex with solutions of certain monovalent inorganic salts, organic amine salts or organic acids in the proper concentrations. It is, of course, well known that solutions of inorganic salts, organic amine salts and organic acids in high concentrations cause the agglomeration of the rubber particles in synthetic latices to such an extent as to cause coagulation thereof. I found that by treating the synthetic rubber latices with solutions of certain inorganic salts, organic amine salts or organic acids in a somewhat weaker concentration than has been employed in the coagulation of such latices, it is posssible to obtain an enlargement of the particle size without any appreciable coagulation or agglomeration and at the same time increase the density of the aqueous media. For convenience this treatment causing an enlargement of the latex particle size and increase in the density of the media has been termed destabilization and the solution of inorganic salts, organic amine salts and organic acids which are added to increase the latex particle size have been termed destabilization agents. This increase in particle size and density greatly facilitates creaming by the addition of conventional creaming agents such as alginates, gum tragacanth and concentrated latices containing approximately 50% total solids or higher can be produced. Such a particle size increase also facilitates the concentration of such latices by centrifuging. Due to the fact that a large amount of emulsifier is removed with the serum in the creaming process and that the particle size has been increased, the creams obtained at 50% total solids content or higher are fluid and films formed therefrom possess low ash and water absorption values.

A difficulty is sometimes encountered in the creaming of synthetic rubber latices by this procedure in that a small amount of coagulate forms when the destabilizer is added in order to effect an increase in the particle size of the latex. While this can be avoided by the use of dilute solutions of destabilizer, the addition of said destabilizer solution produces an appreciable dilution of the latex thereby necessitating the use of larger creaming vessels and increased amounts of creaming agent.

It is the object of the present invention to provide the art with a method whereby synthetic rubber latices may be concentrated satisfactorily by creaming without the use of salts which may tend to coagulate the latices.

It is also the object of this invention to provide an improved method of creaming synthetic rubber latices which not only avoids partial coagulation of the latex but also any substantial dilution of the latex while permitting efficient creaming of the latices with smaller quantities of creaming agent.

These and other objects will appear more clearly from the detailed description and claims set out below.

It has now been found that synthetic rubber latices prepared using ammonium soaps of fatty or rosin acids as emulsifiers in the polymerization reaction can be creamed by adding to the dilute latex (20–45% solids) with agitation controlled amounts of dilute formaldehyde solution to destabilize or increase the particle size of the latex. Following the addition of a stabilizing agent such as ammonia, alkyl amines or potassium hydroxide to the latex, a creaming agent such as ammonium alginate is introduced to produce creaming. The formaldehyde added to the latex acts upon part of the ammonium soap forming hexamethylene tetramine and liberating free fatty acid. The following reaction occurs when ammonium oleate is present in the latex:

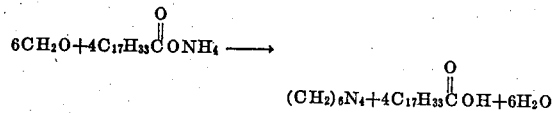

As a result of the soap destruction, and the resulting liberation of free fatty acid, the latex becomes unstable and the particle size increases. After standing for a suitable period of time at room temperature or at temperatures up to 60° C., the latex can be restabilized or quenched by the addition of ammonia, alkyl amines or fixed alkalies which convert the free fatty acid to a soap. The latex may then be creamed as by the addition of ammonium alginate or other suitable creaming agent or it may be concentrated by centrifuging, evaporation or filtering. No inorganic salt type destabilizer is employed in the process and no additional soap has to be added during the destabilization or creaming operations.

The formaldehyde solution used for destabilizing the latex in accordance with the present invention is ordinarily of about 20% concentration. Other solutions containing as little as about 5 weight percent or as much as 30 weight percent of formaldehyde can also be used for destabilization. Instead of applying the formaldehyde in solution, gaseous formaldehyde can be bubbled through the latex with good agitation in order to introduce the amount necessary to destabilize the latex. The amount of formaldehyde used is dependent upon the soap and free alkali content of the dilute latex, the solids content of the dilute latex and on the temperature and time of destabilization. Ordinarily it amounts to between about one part and about ten parts by weight for each 100 parts of dilute latex solids. Formaldehyde is the only aldehyde which will produce satisfactory results in this process.

The restabilizing or quenching agents which may be used in accordance with the present invention include ammonia, alkyl amines such as dimethyl and diethyl amine, alkylol amines such as ethanol amine, diethanol amine, triethanolamines, and fixed alkalies such as sodium or potassium hydroxide or combinations thereof. The amount of quenching agent is ordinarily about one to about six weight per cent based upon the total solids in the dilute latex.

Agents which may be used to effect the creaming of the restabilized latex include compounds such as Carob Bean gum, alkali alginates, gum tragacanth, low viscosity methyl cellulose, sodium carboxy methyl cellulose, alkali pectates, and the like. The creaming agents may be added in aqueous solution or as a dry powder with stirring. Solutions of the creaming agents ordinarily contain from about 1% to 3% of creaming agent and the creaming agent is ordinarily added to the latex in amounts equal to about 0.1 to about 1.5 parts per 100 parts of dilute latex solids. The amount of creaming agent necessary depends on the extent of destabilization and on the solids content of the dilute latex after destabilization and quenching.

This method can be used satisfactorily on synthetic rubber latices prepared by polymerizing conjugated diolefins such as butadiene, isoprene, piperylene, dimethyl butadiene, 2-chlorobutadiene-1,3 taken singly or in mixtures or by copolymerizing mixtures of such conjugated diolefins with unsaturated comonomers such as styrene, alpha methyl styrene, para methyl styrene, alpha methyl para methyl styrene, halogenated styrenes, acrylic nitriles such as acrylonitrile, methacrylonitrile or chloroacrylonitrile, methyl acrylate, methyl methacrylate and unsaturated ketones such as methyl vinyl ketone, methyl isopropenyl ketone and the like in aqueous emulsion using an ammonium soap as the emulsifying agent. These latices will be referred to hereinafter as synthetic rubber latices or synthetic rubber latices of the butadiene type and are not to be confused with any artificial latices or dispersions prepared from solid rubber whether derived from nature or by synthesis.

The soaps which can be used as emulsifiers for the preparation of the dilute latices to be creamed by this process are the ammonium salts of fatty or rosin acids containing from 14 to 20 carbon atoms (e. g., oleic acid, palmitic acid, stearic acid, myristic acid, dehydroabietic acid, di and tetra hydroabietic acids and the like). Instead of a single acid, mixtures of acids may be used especially such commercial mixtures as are obtained by the hydrolysis of naturally occurring fats and oils (e. g., tallow acids and tall oil acids).

In order to obtain satisfactory reaction rate during the emulsion polymerization reaction, the fatty acid should be neutralized to the extent of 85–150% of theory with ammonia. A neutralization of 125% gives excellent results. The sodium and potassium soaps cannot be used as emulsifiers if the latices are to be destabilized by this formaldehyde process. However, soaps of low molecular weight alkyl amines can be employed. The fatty or rosin acid should be present in amount between 2 and 5 weight percent based on the total polymerizable monomers present. In addition, certain polymerization activators such as morpholine, sodium cyanide, potassium ferricyanide and particularly aliphatic mercaptans containing at least 6 and preferably about 12 to 14 carbon atoms per molecule can be added to the polymerization charge.

The dilute latices obtained from the polymerization reaction are ordinarily short-stopped by the addition of a material such as hydroxyl amine hydrochloride, hydroxylamine sulfate, free hydroxylamine, phenyl ethanol amine, mesitol, ditertiary butyl cresol and the like in an amount sufficient to destroy residual catalyst whereupon the latex is vacuum stripped in order to remove unreacted monomers. The stripped latex is then subjected to the creaming process in accordance with the present invention.

The creams prepared in accordance with this invention are stable to mechanical agitation and to compounding dispersions and can be used in conventional latex operations such as spreading, dipping, gelation, impregnation, coating, electrodeposition and the like. Films produced from the creams possess good water resistance.

The following examples are illustrative of the present invention:

*Example 1.*—A synthetic rubber latex was prepared by charging the following materials to a turbo type reactor:

| | Parts |
|---|---|
| Acrylonitrile | 26 |
| Butadiene | 74 |
| Water | 180 |
| Oleic acid (extent of fatty acid neutralization with $NH_4OH$—125% of theory) | 3.5 |
| Potassium persulfate | 0.3 |
| "Lorol" mercaptan | 0.4 |
| Morpholine | 0.1 |

The reaction was carried out for 5 hours at 28° C. and for 6¾ hours at 30° C. At the end of 11¾ hours the conversion of monomers to polymer was 75%. The resultant latex was shortstopped with 0.2% hydroxyl amine hydrochloride and 0.2% 2,6-ditertiary butyl-4-methyl phenol and then stripped of unreacted monomers. It was diluted to 25% total solids prior to the destabilization and creaming operations although higher solids latices can be used as the starting material.

A 20% formaldehyde solution was added to samples of this latex with agitation. No coagulation occurred as a result of this addition. The sample was then permitted to stand for from one to two hours at a temperature of 35° C. during which time the formaldehyde reacted with the ammonium oleate to form hexamethylene tertramine, free oleic acid and water.

As a result of the soap destruction and the resulting liberation of free oleic acid, the latex became unstable and the particle size increased. Addition of potassium hydroxide quench restabilized the latex through the formation of potassium oleate. Ammonium alginate was then added to produce creaming.

A series of runs were carried out using the above procedure under the following general conditions:

| | |
|---|---|
| Dilute latex solids content before destabilization | 25% |
| Formaldehyde solution concentration | 20% |
| Temperature of destabilization | 35° C. |
| Potassium hydroxide quench (as 25% solution) | 1.8 parts dry KOH/100 parts latex solids |
| Ammonium alginate sol. concentration | 2% |

| Run | Parts $CH_2O$ per 100 parts latex solids | Destabilization Time, Hours | Parts ammonium alginate per 100 parts latex solids | Total Solids [2] | |
|---|---|---|---|---|---|
| | | | | Cream | Serum |
| 1 | 6.7 | 1 | 0.3 | 46.0 | 1.93 |
| 2 | 5.9 | 1 | 0.3 | [1] 50.5 | 2.36 |
| 10 | 5.9 | 1 | 0.26 | 50.3 | 3.82 |
| 3 | 5.05 | 1 | 0.3 | 48.5 | 3.66 |
| 6 | 5.05 | 2 | 0.3 | 50.3 | 2.38 |
| 8 | 5.05 | 1 | 0.34 | 49.4 | 2.56 |
| 9 | 5.05 | 1 | 0.26 | 43.3 | 6.40 |
| 4 | 4.2 | 1 | 0.3 | 40.5 | 6.45 |
| 7 | 4.2 | 2 | 0.3 | 47.5 | 3.97 |
| 5 | 3.36 | 1 | 0.3 | No Creaming | |

[1] 0.86% ash on total solids—cream volume 43% of total charge.
[2] After settling 16 hours.

These data indicate that high solids latices can be obtained using this formaldehyde destabilization technique, and that only small quantities of formaldehyde and creaming agent are required.

The data above show that the solids content of the cream can be increased and that of the serum decreased by: (a) increasing the amount of formaldehyde for a given amount of creaming agent and a given destabilization time; (b) increasing the destabilization time, and (c) increasing the quantity of creaming agent for a given amount of formaldehyde.

*Example 2.*—The following series of runs show the relationship between the amount of creaming agent employed and the cream and serum solids obtained from destabilized and quenched latices of two different solids contents. A freshly prepared batch of dilute latex was prepared for use in these runs, employing the same polymerization recipe as described in Example 1. However, due to the volatility of the ammonia during the stripping operation, the soap and fatty acid analyses on the stripped latex were somewhat different than those obtained on the latex of Example 1. If desired, however, the soap and fatty acid contents of the dilute latex can be kept constant by adding ammonia to the latex prior to the destabilization step. The runs were carried out under the following general conditions:

| | |
|---|---|
| Dilute latex solids content | 25% |
| Formaldehyde solution, conc. | 20% |
| Destabilization temperature | 100° F. |
| Destabilization time | 2 hours |
| Potassium hydroxide quench | 1.8 parts/100 parts latex solids |
| Ammonium alginate solution, conc. | 2% |

The results obtained upon creaming this latex with and without water dilution after destabilization are summarized in the following table:

*Part A—No added water*

| Run | Parts $CH_2O$ per 100 latex solids | Parts ammonium alginate per 100 latex solids | Total Solids | |
|---|---|---|---|---|
| | | | Cream | Serum |
| 1 | 6.5 | 0.3 | No Creaming | |
| 7a | 6.5 | 0.33 | 47.7 | 3.82 |
| 8a | 6.5 | 0.36 | 50.4 | 2.70 |
| 9a | 6.5 | 0.39 | 50.5 | 2.64 |
| 10a | 6.5 | 0.42 | 48.4 | 2.04 |
| 11a | 6.5 | 0.45 | 46.0 | 1.87 |

*Part B—250 parts water/100 latex solids added after quenching*

| Run | Parts $CH_2O$ per 100 latex solids | Parts ammonium alginate per 100 latex solids | Total Solids | |
|---|---|---|---|---|
| | | | Cream | Serum |
| 11 | 6.5 | 0.6 | No Creaming | |
| 5a | 6.0 | 0.7 | 47.5 | 2.74 |
| 4a | 6.5 | 0.7 | 48.0 | 2.33 |
| 6a | [1] 6.5 | 0.7 | 47.4 | 3.11 |
| 3a | 7.0 | 0.7 | 48.0 | 2.47 |
| 2a | 7.5 | 0.7 | 48.3 | 2.43 |
| 1a | 8.0 | 0.7 | 46.7 | 2.07 |
| 14 | 6.5 | 0.8 | 46.6 | 1.7 |
| 15 | 6.5 | 0.9 | 41.1 | 1.18 |
| 16 | 6.5 | 1.0 | 36.7 | 0.97 |

[1] +5.3 cc. 26% $NH_3$ after KOH quench.

The data indicate that for a given amount of formaldehyde destabilizer, an increase in the quantity of creaming agent employed produces an improvement in the cream and serum solids up to the point at which overthickening occurs. With water dilution the same effect is observed and in addition an increase in the quantity of destabilizer (for a given amount of ammonium alginate) has comparatively little effect on the cream and serum solids. The best results were obtained therefore with the undiluted latex using 6.5 parts of formaldehyde and 0.39 parts of ammonium alginate per 100 parts of latex solids.

It may be readily seen from the foregoing description that I have provided a novel method whereby creams of high solids content may be readily prepared from synthetic rubber latices. It will be understood, however, that my invention is not limited to the foregoing specific embodiments but may be varied without departing from the purview of the following claims.

What I claim and desire to secure by Letters Patent is:

1. The process of improving the creaming of synthetic latices obtained by the polymerization of a conjugated compound selected from the group consisting of butadiene, isoprene, piperylene, dimethyl butadiene and 2-chlorobutadiene-1,3 in aqueous emulsion using an ammonium soap emulsifier which comprises adding formaldehyde to said latex to react with the emulsifier to make the latex unstable and to increase the particle size of the latex and then adding an alkali to the latex to render it stable.

2. The process of creaming synthetic latices prepared by the polymerization of butadiene in aqueous emulsion using an ammonium soap emulsifier which comprises adding formaldehyde to said latex to react with the emulsifier to make the latex unstable and to increase the particle size of the latex, adding an alkali to the latex to render it stable, adding a creaming agent to the thus treated latex and finally effecting a separation between the cream and the serum.

3. The process of creaming synthetic latices prepared by the polymerization of a mixture of butadiene-1,3 and acrylic nitrile in aqueous emulsion using an ammonium soap emulsifier which comprises adding formaldehyde to said latex to remove at least a portion of the emulsifier and render the latex unstable and to increase the particle size of the latex, adding an alkali to the latex to render it stable, adding a creaming agent to the thus treated latex and effecting a separation between the cream and the serum.

4. The process of creaming synthetic latices prepared by the polymerization of a major proportion of butadiene-1,3 and a minor proportion of acrylic nitrile in aqueous emulsion using ammonium oleate as the emulsifier which comprises adding 1 to 10 parts by weight of formaldehyde to 100 parts of said latex to increase the particle size of the latex, adding an alkali to the latex to render it stable, adding a creaming agent to the thus treated latex and effecting a separation between the cream and the serum.

5. The process of improving the creaming of synthetic latices obtained by the polymerization of butadiene in aqueous emulsion using an ammonium soap emulsifier which comprises adding formaldehyde to said latex in the ratio of from 1 to 10 parts by weight of formaldehyde per 100 parts of dilute latex solids to increase the particle size of the latex and then adding an alkali to the latex to render it stable.

6. The process of creaming synthetic latices prepared by the polymerization of butadiene in aqueous emulsion using an ammonium soap emulsifier which comprises adding formaldehyde to said latex in the ratio of from 1 to 10 parts by weight of formaldehyde per 100 parts of dilute latex solids to increase the particle size of the latex, adding an alkali to the latex to render it stable, adding a creaming agent to the thus treated latex and finally effecting a separation between the cream and the serum.

7. The process of creaming synthetic latices prepared by the polymerization of a mixture of butadiene-1,3 and acrylic nitrile in aqueous emulsion using an ammonium soap emulsifier which comprises adding formaldehyde to said latex in the ratio of from 1 to 10 parts by weight of formaldehyde per 100 parts of dilute latex solids to increase the particle size of the latex, adding an alkali to the latex to render it stable, adding a creaming agent to the thus treated latex and effecting a separation between the cream and the serum.

8. The process of creaming synthetic latices prepared by the polymerization of butadiene-1,3 in aqueous emulsion using ammonium oleate as the emulsifier which comprises adding formaldehyde to said latex in the ratio of from 1 to 10 parts by weight of formaldehyde per 100 parts of dilute latex solids to increase the particle size of the latex, adding ammonia to the latex to render it stable, adding ammonium alginate to the thus treated latex and effecting a separation between the cream and the serum.

9. The process of creaming synthetic latices prepared by the polymerization of a mixture of butadiene-1,3, and acrylic nitrile in aqueous emulsion using ammonium oleate as the emulsifier which comprises adding formaldehyde to said latex in the ratio of from 1 to 10 parts by weight of formaldehyde per 100 parts of dilute latex solids to increase the particle size of the latex, adding ammonia to the latex to render it stable, adding ammonium alginate to the thus treated latex and effecting a separation between the cream and the serum.

ERVING ARUNDALE.

REFERENCES CITED

The following references are of record in the file of this patent:

UNITED STATES PATENTS

| Number | Name | Date |
|---|---|---|
| 1,887,201 | Hayes et al. | Nov. 8, 1932 |
| 2,357,861 | Wilson | Sept. 12, 1944 |